(12) United States Patent
Cramer

(10) Patent No.: US 9,073,473 B2
(45) Date of Patent: Jul. 7, 2015

(54) MOBILE WORK TRAILER

(71) Applicant: Jeff Cramer, Chula Vista, CA (US)

(72) Inventor: Jeff Cramer, Chula Vista, CA (US)

( * ) Notice: Subject to any disclaimer, the term of this patent is extended or adjusted under 35 U.S.C. 154(b) by 207 days.

(21) Appl. No.: 13/714,253

(22) Filed: Dec. 13, 2012

(65) Prior Publication Data

US 2014/0165322 A1 Jun. 19, 2014

(51) Int. Cl.
  *B60S 1/64* (2006.01)
  *B60P 3/14* (2006.01)
(52) U.S. Cl.
  CPC ........................................ *B60P 3/14* (2013.01)
(58) Field of Classification Search
  USPC ................................ 15/313, 340.1; 296/24.32
  See application file for complete search history.

(56) References Cited

U.S. PATENT DOCUMENTS

| | | | |
|---|---|---|---|
| 2,505,658 A | 4/1950 | Wilson | |
| 4,055,206 A | 10/1977 | Griffin | |
| 4,133,572 A | 1/1979 | Robbins et al. | |
| 4,230,358 A | 10/1980 | Legueu | |
| 4,516,308 A | 5/1985 | Urban | |
| 4,633,055 A * | 12/1986 | Conley | 219/121.39 |
| 5,333,420 A * | 8/1994 | Eden | 52/67 |
| 5,383,698 A | 1/1995 | Buchholz | |
| 5,921,034 A | 7/1999 | Tobin | |
| 6,283,537 B1 | 9/2001 | DeVore, III | |
| 6,817,653 B2 | 11/2004 | Ropp | |
| D588,773 S | 3/2009 | Cona et al. | |
| 7,588,278 B1 | 9/2009 | Luneack | |
| 7,591,497 B2 * | 9/2009 | Johns | 296/3 |
| 7,647,956 B1 | 1/2010 | Cona et al. | |
| 8,317,254 B2 * | 11/2012 | Scott-Greavu | 296/168 |
| 8,439,426 B2 * | 5/2013 | Dempsey et al. | 296/173 |
| 2006/0214446 A1 | 9/2006 | Johns | |
| 2011/0254305 A1 * | 10/2011 | Gogola | 296/26.13 |
| 2013/0160755 A1 * | 6/2013 | Amat | 126/4 |

* cited by examiner

*Primary Examiner* — Dung Van Nguyen
(74) *Attorney, Agent, or Firm* — Lewis Kohn & Walker LLP; Kent Walker; Kari Moyer-Henry

(57) ABSTRACT

A mobile work site having a deployed position and a stowed position for travel is disclosed. Importantly, a first ever vacuum system is configured with permanent piping to the trailer. A vacuum boom is further provided for added versatility. The invention has further been designed with optimal size in mind so that a bulky configuration is made unnecessary. Further the design provides a large amount of horizontal surface area for measuring and planner tables, feeder tables and cutting tables. Additionally, multiple electrical outlets are made available to eliminate any need for long cords. Also, dual, separate and redundant electrical circuits are provided to power the entire trailer. Racks are included herein for transporting lumber and trim materials.

6 Claims, 11 Drawing Sheets

MOBILE WORK TRAILER

BACKGROUND OF THE INVENTION

1. Field of the Invention

The present invention pertains generally to the carpentry, and other builder work site applications. More particularly, the invention relates to an improved mobile work trailer having a central vacuum system for dust abatement and further devoid of size constraints of a full-size trailer.

2. Description of the Prior Art

Many towable work trailers have been introduced heretofore with varying degrees of success. An early example introduced by Griffin, U.S. Pat. No. 4,055,206, entitled "Composite Shop Trailer," being awarded patent protection in 1977, has different work stations and feeder tables having a foldable housing.

The situation at the time as told by Griffin is that it's become common practice in the construction industry, whenever a house or building containing a substantial amount of wood is being built, to set up a radial saw with elongated lumber supporting benches on either side thereof. These benches serve the function not only to support the work piece while it is being cut but also to support the same at a comfortable height while the operator of the saw measures or otherwise marks the location to be cut.

On occasion, a jointer is desirable or necessary for smoothing cuts made by the saw or for other purposes. This additional equipment requires leveling and a steady footing as well as a protection cover. Because of the time and effort required in setting up and taking down the radial saw at the job site, as well as the jointer if the same is used, planning is required in advance and a substantial amount of work to justify the same. For small jobs where a saw and/or jointer would be very helpful, the time required in properly setting up and taking down this equipment may well negate the advantages expected to be derived and thus the same would not be used.

Another disadvantage in using the semi-permanent saw or jointer installation is that because job sites are usually left unprotected at night and over weekends, all of the tools and other associated equipment must be daily removed from the job site and returned at the beginning of the next work day. This is not only laborious but time consuming which reduces the output of the worker who, in this case, is usually a skilled worker and, therefore, is paid at a higher than normal rate.

Essentially, many factors for portable work sites must be weighed and counterbalanced such as ease of setup and breakdown, weatherproofing, and further the overall utility provided per cubic foot of space required so that a solution can fit in relatively small areas such as garages and carports.

Another example was provided by Buchholz, U.S. Pat. No. 5,383,698 and entitled "Tool Trailer with Open End." This particular trailer is not very bulky and therefore versatile size-wise, however only one saw (lumber) may be set up at a time. Another example is provided by Luneack, U.S. Pat. No. 7,588,278 and entitled "Trailer Workshop." This particular design has a housing that folds out; and again it appears that only one workstation is provided.

Importantly more recently, greater attention has been given to hazardous materials in the form of airborne particles that can have cumulative harmful effects if breathed over a long period of time. This poor air quality can lead to for example, Chronic Obstructive Pulmonary disease (COPD) and is presently of serious concern among occupation hazards. Federal, state, and local OSHA agencies are attempting to set safety standard for breathing in work environments however, enforcement remains an issue. Breathing apparatuses provided are often uncomfortable and can fog up easily, so, vacuum systems for dust abatement are more recently preferred. However, the problem of how to configure a vacuum system to any portable work environment has not been addressed before.

In light of the present needs and state of the art as described herein it is an object of the present invention to provide a portable carpentry trailer having multiple workstations in a deployed position. It is additionally an object of the present invention to provide a weatherproof design in a secured position but also limiting the design in length, width, and height so the stowed work area can fit in otherwise inaccessible places. It is yet further an object of the present invention to provide a solution that limits exposed (or unsecured) power lines to multiple workstations. It is still yet further an object of the present invention to provide a solution for adequate storage of several types of saws in the stowed (secured) position. It is additionally still an object of the present invention to provide a system with separate power system for redundancy and as to provide a way to not overload a single circuit breaker during operation. It is an additional object of the present invention to provide racks for transport and stowage of lumber and trim materials. It is another objective of the present invention to provide a portable workstation that has fixed tool boxes and other portable tool boxes to be arranged around the work site and later stowed for transportation. It is a further design objective to put fixed tool boxes, feeder table and workstation table at the same vertical level so maximize versatility.

BRIEF SUMMARY OF THE INVENTION

The present invention specifically addresses and alleviates the above mentioned deficiencies associated with the prior art. More particularly, the present invention, in a first aspect is a portable work area particularly for carpentry comprising: a flat bed trailer configured to be coupled to a trailer hitch; and a frame defining a height of the portable work area. Additionally further the frame comprises an aperture and a horizontal member slidingly disposed within the aperture, wherein the horizontal member is configured to support a work table in a deployed position, and wherein the horizontal member is secured slidingly inwardly in a stowed for transport position.

The portable work area particularly for carpentry or masonry herein is further characterized wherein the horizontal member is secured with a detent pin in the stowed for transport position. Still further, the invention in this aspect comprises: a forward permanent structural member configured horizontally at a forward end of the portable work area above a bumper level; a horizontal table support frame slidingly configured to the frame, the frame approximately at a same height as forward permanent structural member; and a plurality of female structural members provided along the rear permanent structural member, each of said plurality configured to receive a corresponding two-by-four, wherein each of the corresponding two-by-fours are arranged over the horizontal table support frame and provide support for a forward work table (plywood cutting table).

Still further, the portable work area particularly for carpentry as described herein further comprises a pipe fixed to the flat bed trailer, the pipe further coupled to a vacuum motor, the vacuum motor providing a negative pressure with respect to atmosphere at the pipe fixed to the flat bed trailer. Also the invention in this aspect comprises a vacuum boom that has a vertical rigid post, a horizontal rigid boom, a flexible pipe connected to the vertical pipe. The horizontal rigid boom and a rotating member provides for the flexible pipe to rotate around the vertical pipe.

The invention herein in this aspect still further comprises dual first and second electrical circuits minimizing a chance that the portable work area will draw too much power from a single source and thereby trip a circuit breaker. Ample storage is yet further provided by the present invention including: a plurality of storage boxes configured to the flat bed trailer; and a work table supported by the horizontal member, the work table further coupled to a power saw, wherein the storage boxes have a height being a same height as the work table.

Also according to the present invention in the first aspect a compressor is configured to the work trailer and provides compressed air to each of a plurality of work stations. The portable work area particularly for carpentry or masonry in this aspect also includes a lumber rack configured thereto for storing and transporting wood and trim materials. Lastly, a vacuum filter and a vortex dust separator for separating dust from air are provided thereby prolonging a need to clean a vacuum filter.

The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF PREFERRED EMBODIMENTS

Figure 1:
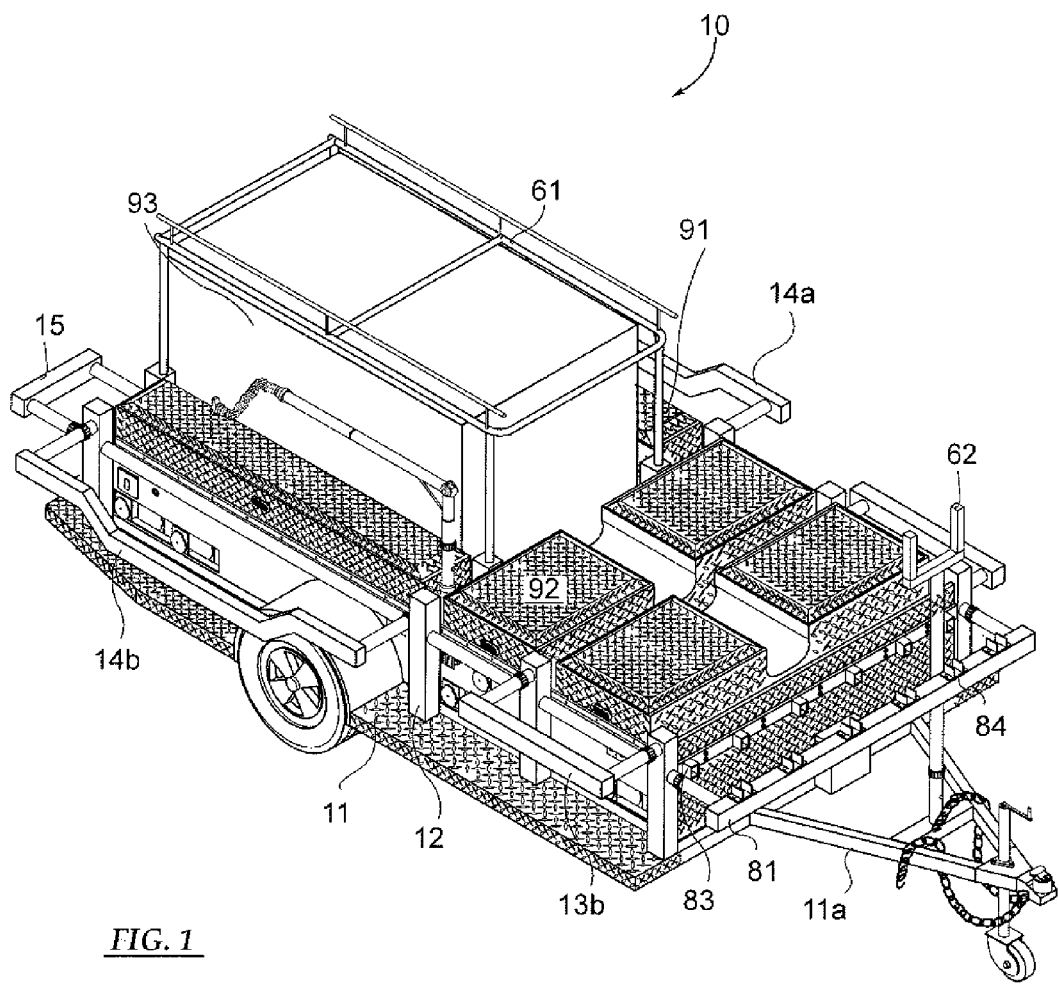
FIG. 1 is a perspective illustration of a first preferred work trailer embodiment of the present invention.

Initially with regard to FIG. 1, a first preferred mobile work trailer 10 of the present invention is illustrated in perspective. In a broad sense, the present invention is a flat bed trailer 11 with a plurality of vertical posts 12 configured thereto, the posts 12 further having horizontal members 13a, 13b, 14a, 14b, 15 slidingly into and out of apertures 18 (FIG. 3A) in the vertical posts 12. The horizontal members 13a, 13b, 14a, 14b, 15 are designed such that they can each support a respective power saw type workstation as further described herein. Examples of power saw-type workstations include: a chop saw, a router table, table saw etc. The horizontal members 13a, 13b, 14a, 14b are shown here in their stowed for transport position.

Also broadly speaking, the invention comprises a flat bed trailer with a frame 12, 61 or a superstructure 12, 61 defining a height thereof. The superstructure 12, 61 consists of a plurality of vertical posts 12 with a lumber rack 61 configured to four of said posts 12. A hitch extension 11a is provided to a front end of the flat bed 11 to from a chassis 11, 11a. A pole with a U-configuration 62 at a top thereof is configured to the front end hitch extension 11a. This vertical configuration 62 is provided together with the lumber rack 61 for transporting lengths of wood and trim materials.

Configured at an interior of the flat bed 11 are several tool boxes 91, 92, 93. More particularly, elongated tool boxes 91 along rear side create an empty space therebetween for a portable tool box 93 on wheels (also termed "gang box"). Other more square shaped tool boxes 92 are configured toward a front of the flat bed 11 trailer. All tool boxes 91, 92, 93 provide plenty of storage for power tools 99, work tables 51 (FIG. 7B), and accessory items. A vacuum motor 23 and a compressor motor (not shown) are configured to two of the substantially square shaped tool boxes 91 as further detailed herein.

Figure 2A:
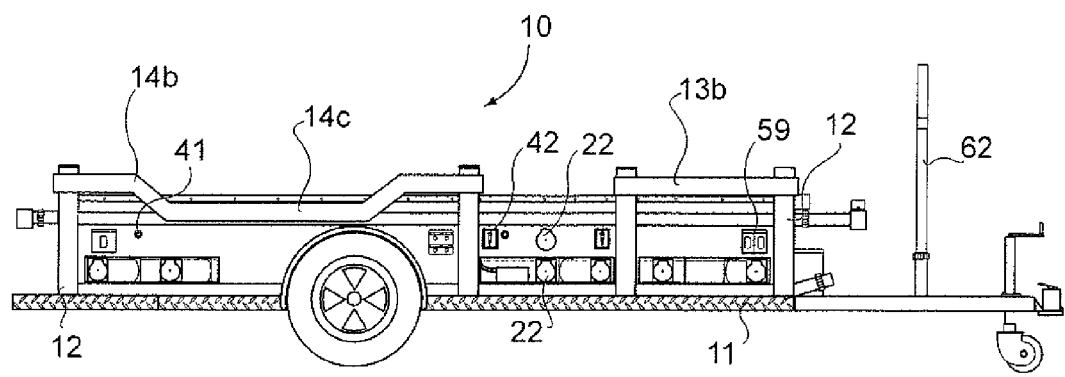
FIG. 2A is a right side profile view thereof.

Regarding FIG. 2A, a right side aspect view is provided showing the trailer 10 in the stowed position. Generally, horizontal members 13b, 14b are seen and their relative heights are shown. A relatively longer horizontal member 14a, 14b is provided (as compared to 13a, 13b is shown with a dip 14c) to accommodate a chop saw or table saw with more horizontal feeder surface area required for that type of saw. Importantly, a centralized vacuum system 20 (FIG. 3A) is provided by the present invention as further described herein. Vacuum suction ports 22 are included with vertical spacing so that suction can be made available to dust from a work piece above and falling below a work table 51. The vacuum ports 22 are also configured with valves (controlled by switches) so that when a workstation is not being used, more negative pressure can be provided to the other stations 22 that are being used. This configuration can work in conjunction with a vacuum motor 23 having multiple speeds and therefore give the carpenter a choice of optimum speeds for the amount of suction needed. Multiple electrical outlets 59 are provided at least about one 59 for each work station or more to eliminate any requirement for long electrical cords that encumber a work area. Multiple compressed air ports 41 and their respective switches 42 additionally provide versatility to the present invention. Similar switches 42 control vacuum valve ports 22.

Figure 2B:
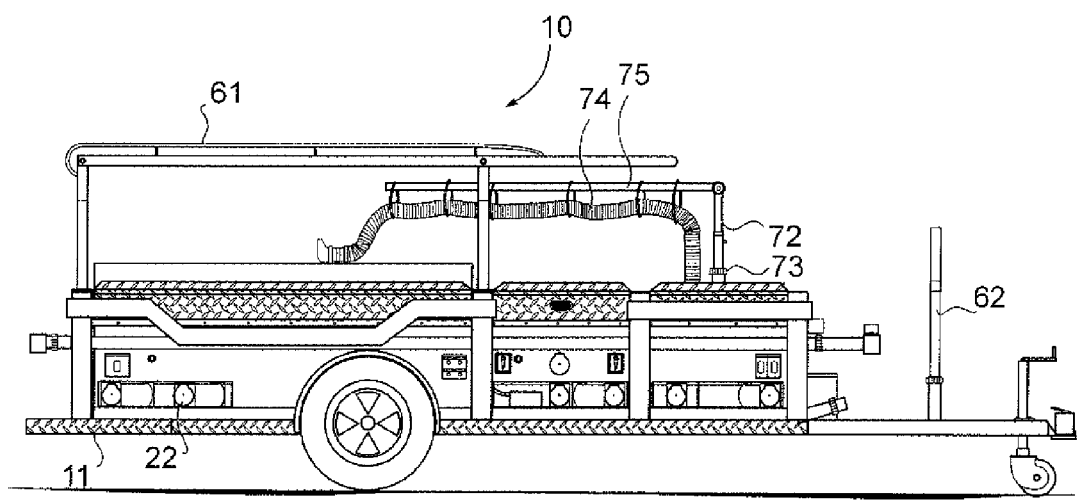
FIG. 2B is a right side profile view with additional super structure shown.

FIG. 2B provides a right side aspect view of the first preferred embodiment however with the full superstructure 61 provided as a lumber rack 61 together with the forward pole with U-configuration 62. Also illustrated is a novel vacuum boom 75 of the present invention. The boom 75 provides added versatility to reach between several work stations. In a first embodiment as shown, the vacuum boom 75 comprises a vertical rigid post 72 coupled to a horizontal rigid boom 75, in addition to a flexible vacuum suction hose 74 coupled to the boom 75, further wherein boom and post 72, 75 can rotate about rotating member 73 (collar). In a second embodiment the post 72 is a hollow pipe and the flexible hose 74 is directly coupled to the hollow pipe 72 with the boom 75 and hose 74 connected thereto. Negative pressure would be provided inside the hollow pipe 72 by vacuum motor 23 (FIG. 1, FIG. 3A, FIG. 3B, FIG. 7A, FIG. 7B). Alternatively, the post 72 and boom 75 could be located in the front portion of the trailer (FIG. 2B and FIG. 2C) or it 72, 75 could be located at approximately at a mid-point of the trailer and off to one side.

It should be noted that even with a full superstructure 61 that the invention 10 design can be stored inside a car port or garage; and if necessary, the superstructure or lumber rack 61 can be removed from vertical supports 12 to provide a smaller profile if desired. These particular advances, while providing multiple work stations, are currently absent in the prior art.

Figure 2C:
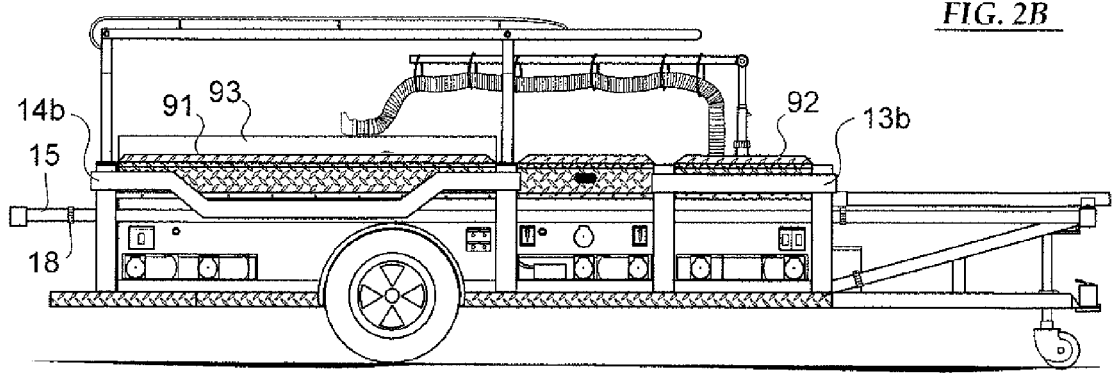
FIG. 2C is a right side profile view with additional super structure shown, however with horizontal members extended to support work tables and saws.

Also regarding FIG. 2B and FIG. 2C, the portable work area 10 particularly for carpentry or masonry further includes a plurality of storage boxes 91, 92, 93 configured to the flat bed trailer 11. As indicated, first and second 91, 92 storage boxes are fixed and the third gang box 93 has wheels and is portable. Importantly, first and second storage boxes 91, 92 are approximately at a same height as horizontal members 13b, 14b so that when a worktable 51 is configured on top of a horizontal members 13b, 14b (FIG. 7B), the configuration 51, 91, 92, allows to expand horizontal surface area thereof.

Figure 3A:
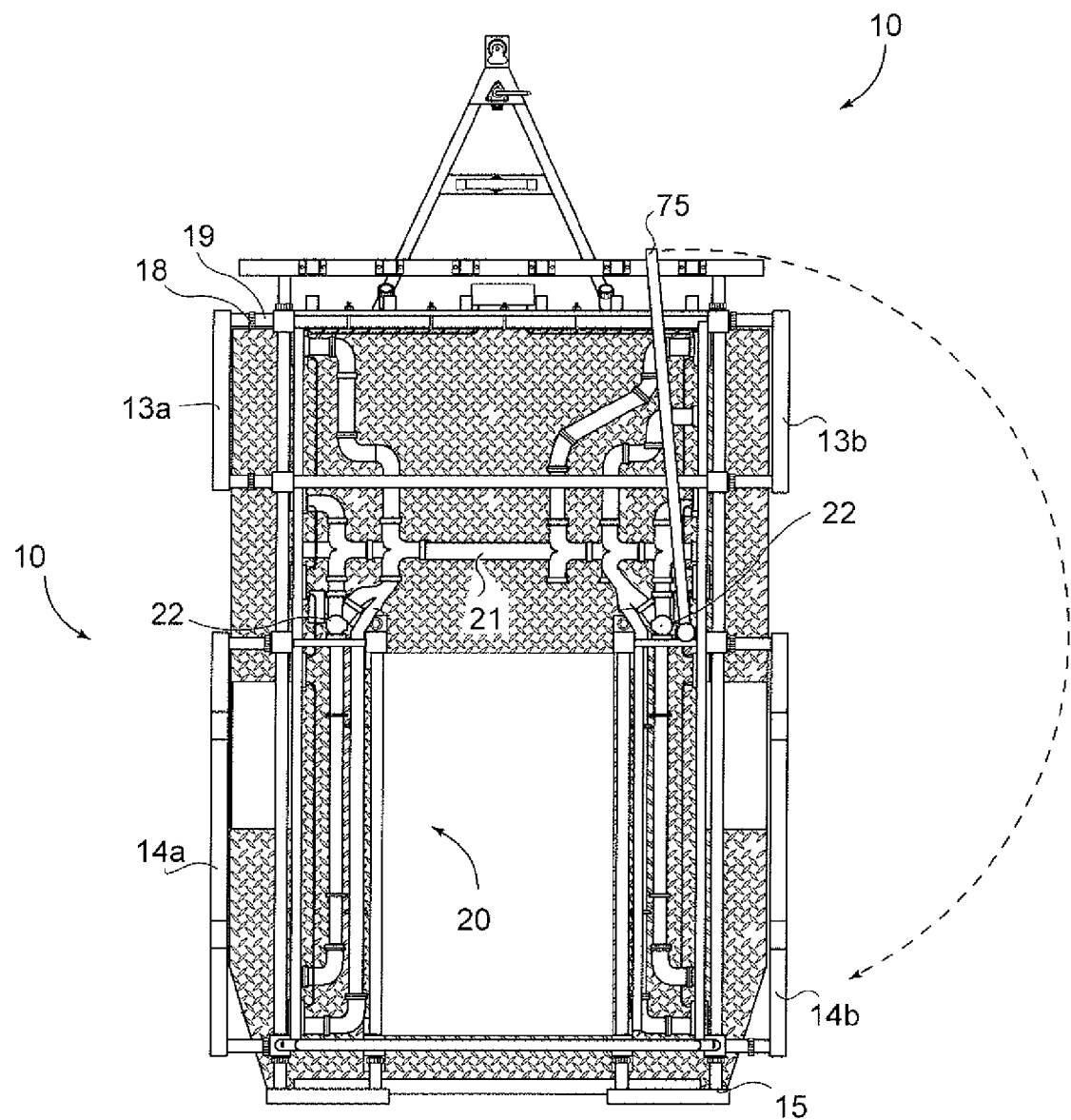
FIG. 3A is a top plan view of the first preferred work trailer embodiment having tool boxes remove to reveal vacuum system piping underneath.
Figure 3B:
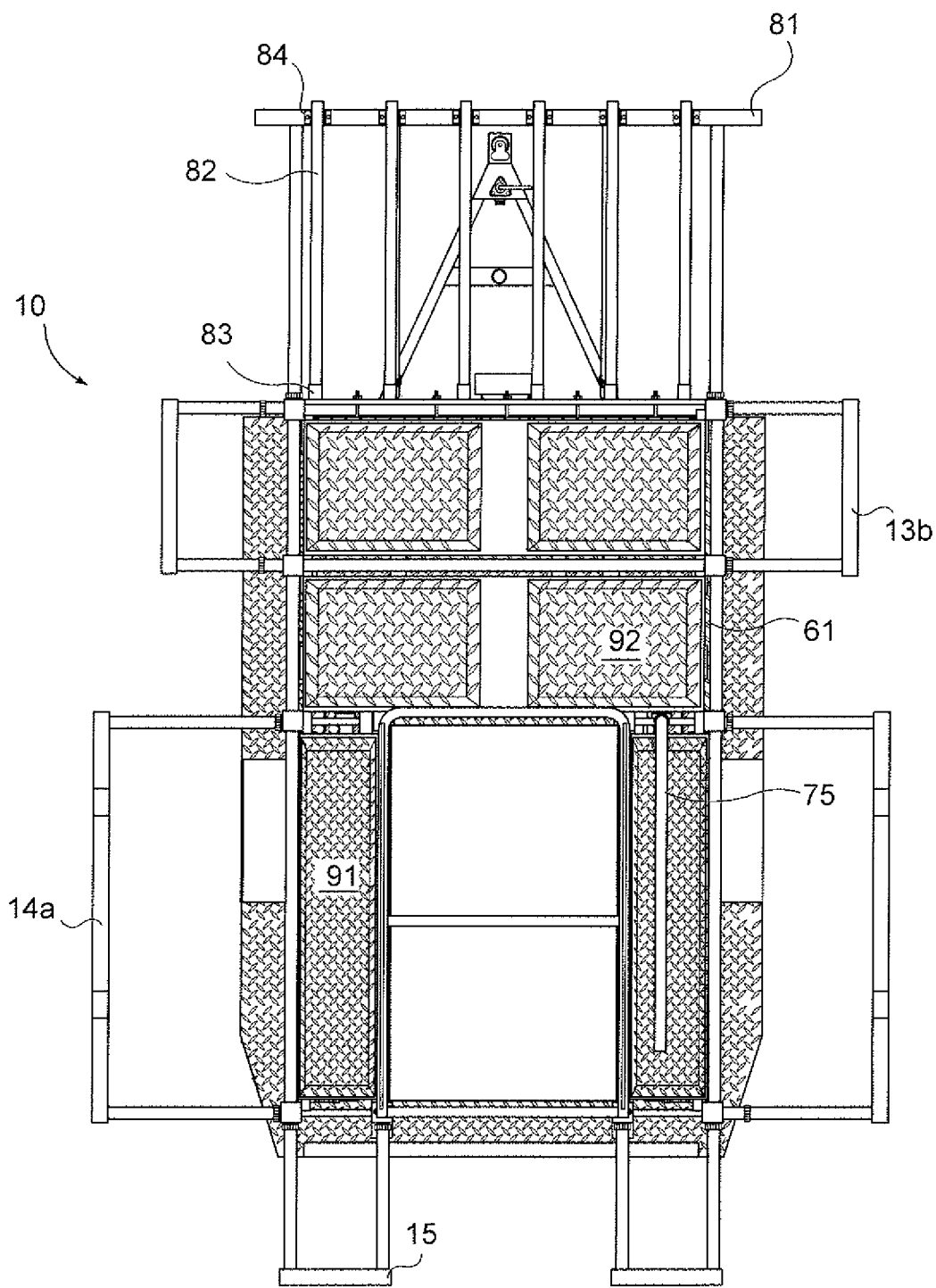
FIG. 3B is a top plan view with tool boxes and super structure in place.
Figure 7A:
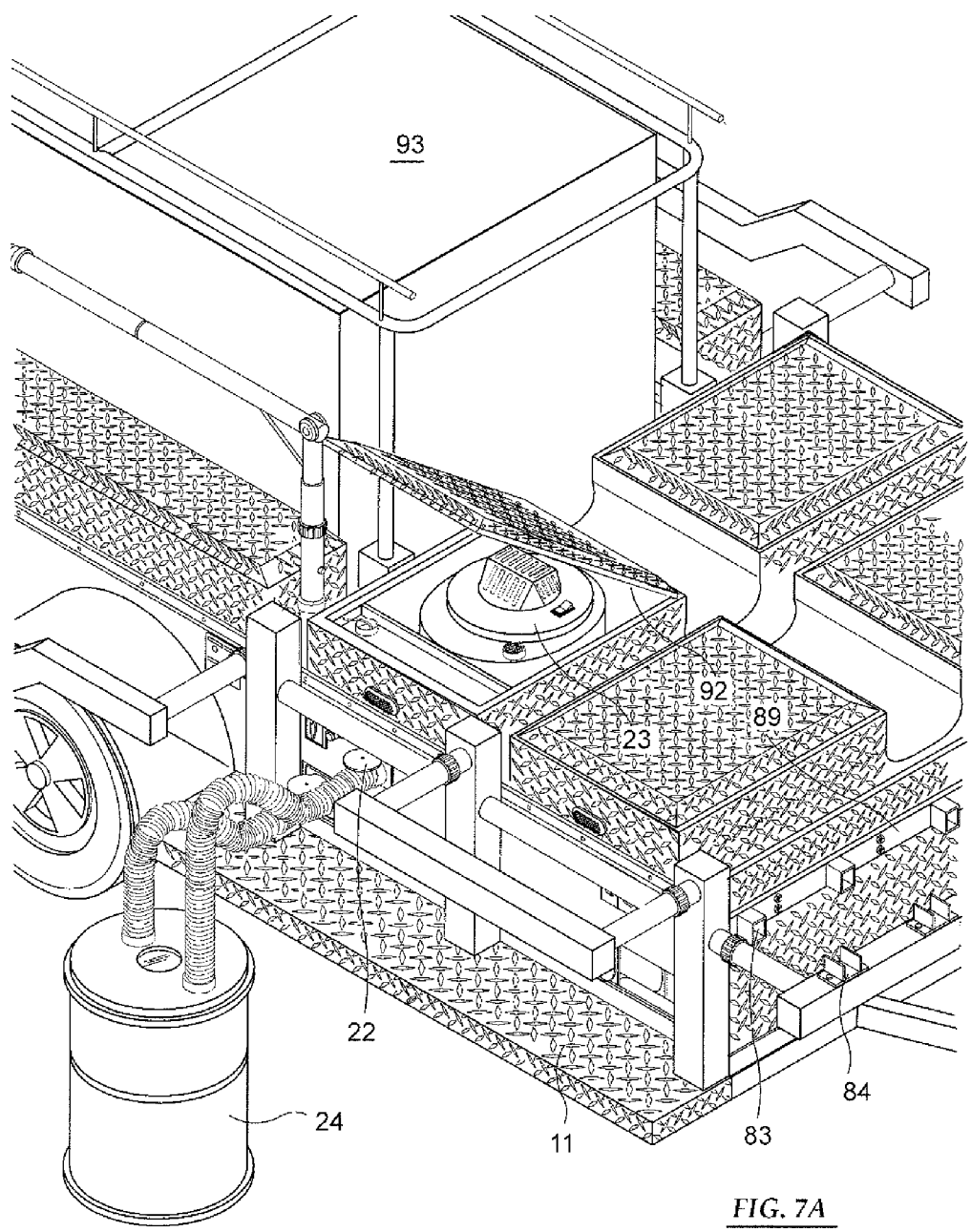
FIG. 7A is an enlarged perspective view of a front quarter portion.
Figure 7B:
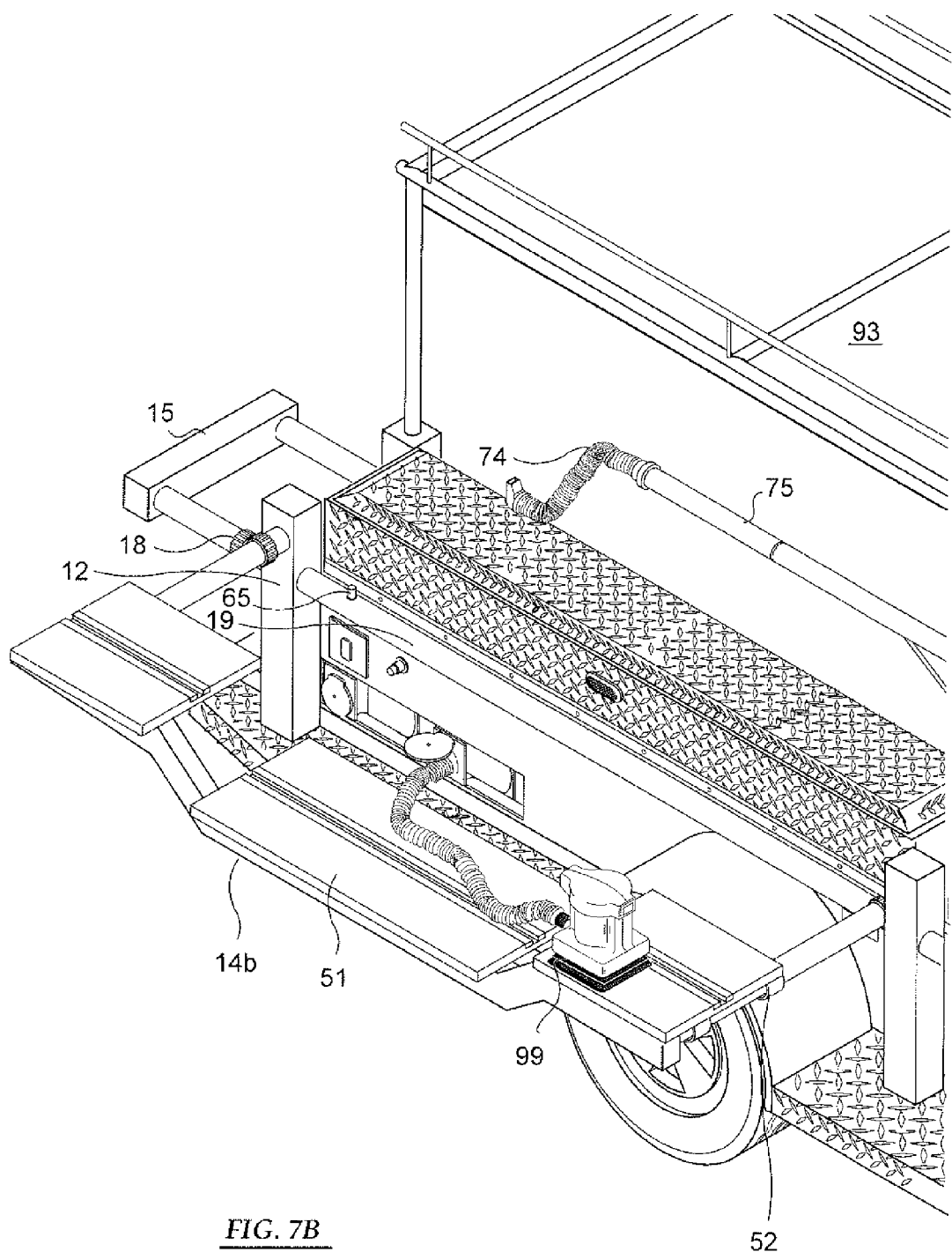
FIG. 7B is an enlarged perspective view of a rear quarter portion.

FIG. 2C additionally illustrates a deployed position of rear horizontal members 15 as does FIG. 3B and FIG. 7B, provide even more additional space to support a work table 51. According to FIG. 3A taken together with FIG. 7A, a vacuum system 20 is provided to the present invention 10. FIG. 3A illustrates permanent rigid pipe 21 configured underneath tool boxes 91, 92 (not shown as to illustrate the piping 21) and fixed to the flat bed trailer 11. The vacuum system 20 further includes vacuum ports 22 to selectively provide dust abatement around the portable work trailer 10.

More specifically with regard to FIG. 7A, the vacuum motor 23 provides a negative pressure with respect to atmosphere at the pipe fixed to the flat bed trailer 11. Flexible vacuum system 20 pipe 74 is further provided to the system via the various ports 22. Further, the vacuum 23 may be remote controlled.

Also according to a preferred embodiment, the vacuum system 20 essentially contains two separate dust and particulate filters. A first filer 24 comprises a vortex dust separator that is separate from the motor housing 23. A second filter located downstream of the first filter 24 is additionally provided within the vacuum motor housing 23. In this configuration, the second filter will only very infrequently require cleaning and virtually no particulates will be reintroduced to the environment. The vacuum system 20 and particulate filters 23, 24 are particularly important where treated wood is used; and further where particle board is cut that typically has glue that may contain toxins if inhaled. Additionally regarding FIG. 7A, tool box 92 houses the vacuum motor 23 and is further insulated so that the resultant noise is minimal.

Figure 4:
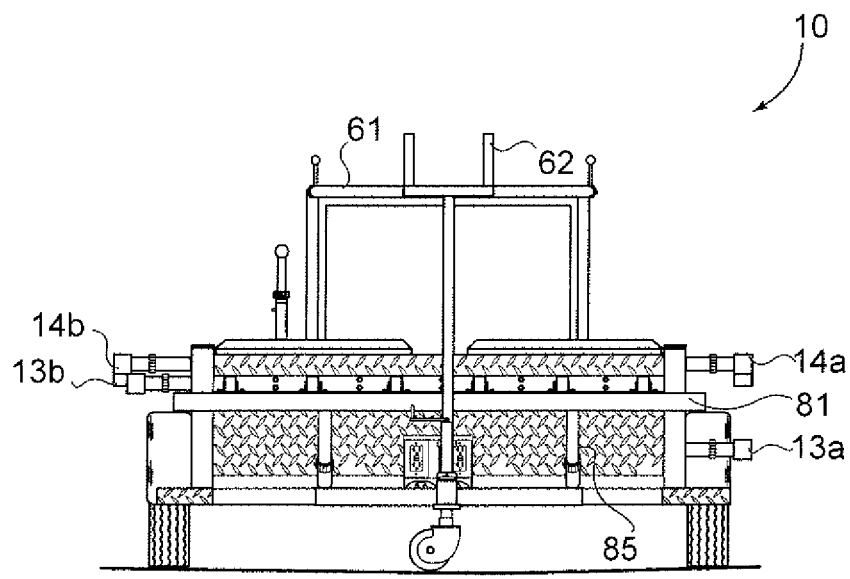
FIG. 4 is a front end view thereof.

With regard to FIG. 3B a top plan view illustrating toolbox 91, 92 arrangements over the vacuum system 20 piping 21 is shown. Also horizontal members 13a, 13b, 14a, 14b, 15 are slidingly disposed to the fixed members 19 via a collar 18 (FIG. 3A and FIG. 7B). As additionally described herein, the horizontal members 13a, 13b, 14a, 14b, 15 support work tables 51 and various types of power tools 99 to include but not limited to: table saws, chop saws, miter saws, routers, sanders and grinders. A top view of a surface planning table 81, 82 is additionally provided in a deployed position. The table 81, 82 can also be used as an additional feed table, a track saw table, or plywood cutting table and is additionally illustrated in FIG. 4 and FIG. 7E. As seen in FIG. 4, supports 85 for the plywood cutting table 81 are removable for the stowed for transport position. This view also reveals that sliding horizontal members 13a, 13b, 14a, 14b, 15 can be provided at different heights to accommodate power tools that have different heights to make the work stations and fixed tool boxes 91, 92 approximately at the same height.

In a preferred embodiment, member 13a supports a table saw, member 13b supports a router table, member 14a supports a chop saw, and member 14b supports an additional sanding work table. In this configuration, the chop saw itself may be removed and the chop saw table can be used as a table saw outfeed table.

Figure 5:
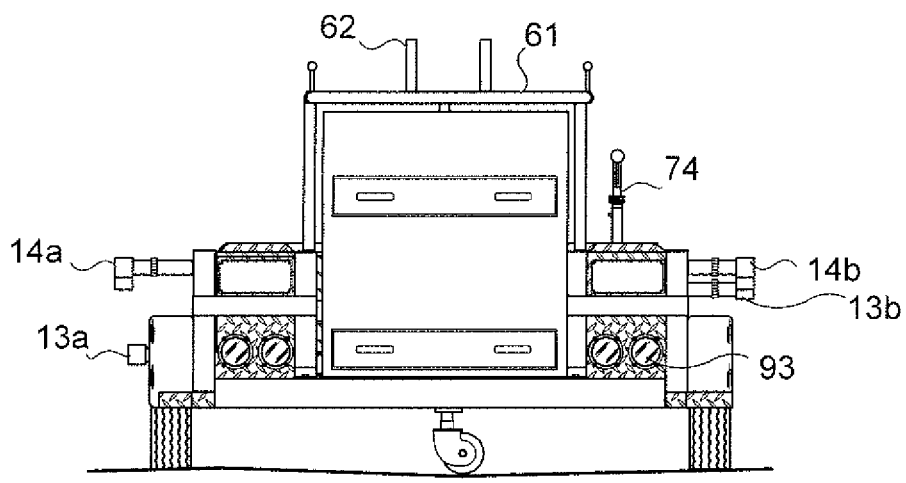
FIG. 5 is a rear end view of the mobile work trailer.
Figure 6A:
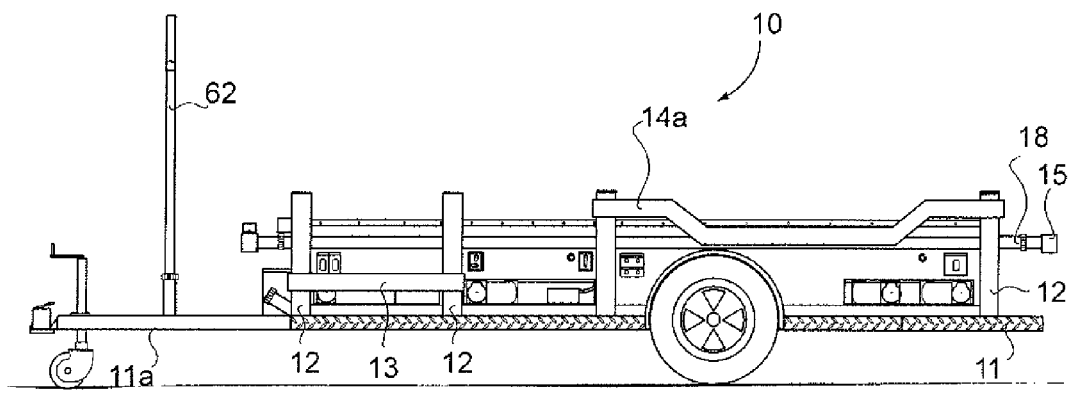
FIG. 6A is a left side profile view without the additional super structure shown.
Figure 6B:
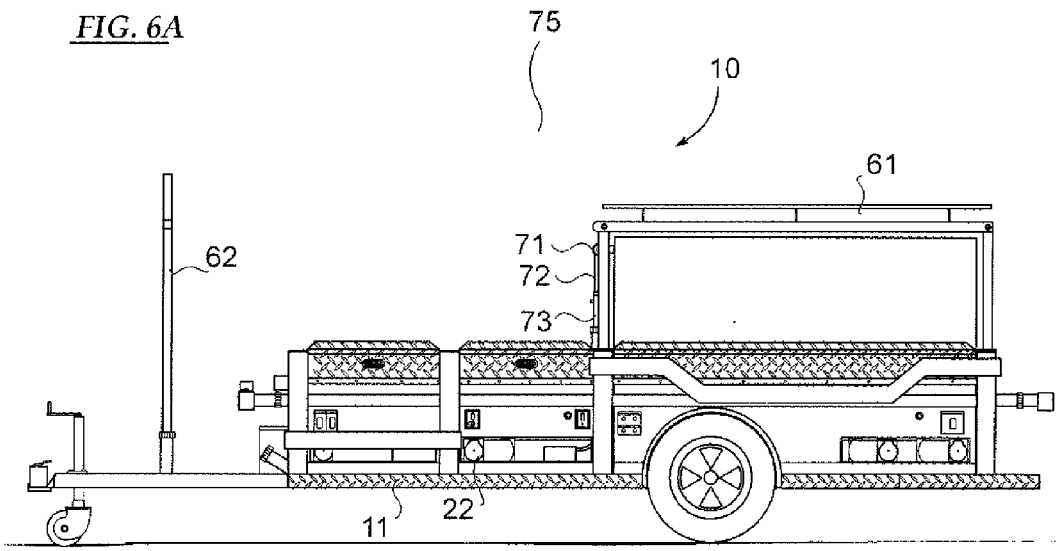
FIG. 6B is a left side profile view with additional super structure shown.

FIG. 5 provides a rear end view of the first preferred embodiment 10. Break lights 93 are provided and configured to the flat bed trailer 11. Electric brakes are further configured to the trailer 11. FIG. 6A illustrates a left side view of the present invention with the superstructure 61 removed. As stated, horizontal member 14a can support a chop saw table and member 13a can provide support to a table saw. FIG. 6B illustrates a left side view of the present invention with the superstructure 61 shown.

Regarding FIG. 7B, the worktables 51 have extensions 52 to couple to sliding horizontal members 13a, 13b, 14a, 14b, 15. In a preferred embodiment, the horizontal members 13a, 13b, 14a, 14b, 15 are round poles and the extensions 52 are rounded to securely interface horizontal members 13a, 13b, 14a, 14b, 15. Also in a preferred embodiment, aperture 18 protrudes outwardly from vertical support members 12 and forms a collar 18. Horizontal member 13a, 13b, 14a, 14b, 15 slide out of the apertures 18, and more specifically out from fixed horizontal members 19 and secured by detent pins 65 for stowed for transport position. In an alternative embodiment, apertures 18 are configured directly to vertical support members 12.

Figure 7C:
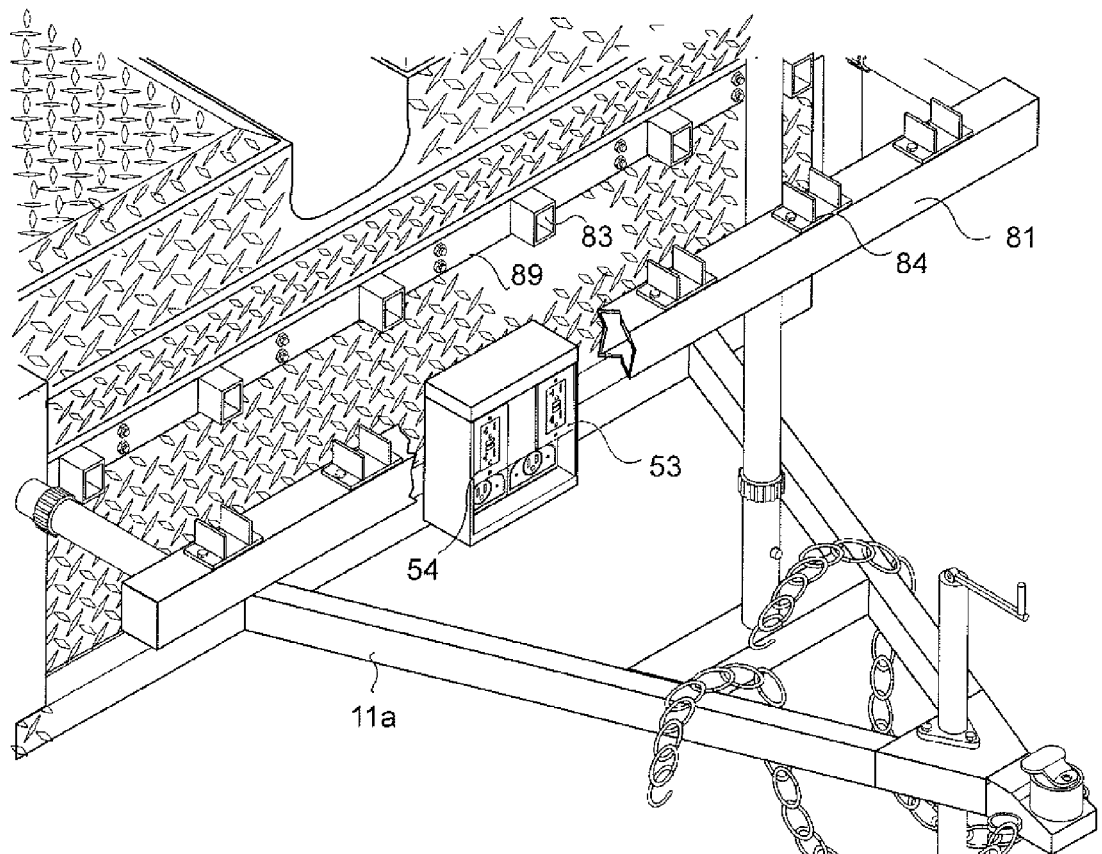
FIG. 7C is an enlarged perspective view of a front hitch portion.
Figure 7D:
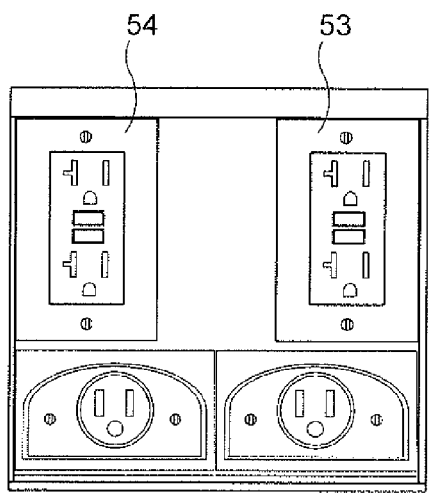
FIG. 7D is an enlarged view of redundant electrical circuits of the present invention.

With reference to FIGS. 7C and 7D, redundant twenty amp power circuits 53, 54 are provided so that all power is not supplied through any one circuit breaker to minimize the chance of a tripping event. All circuits 53, 54 are ground-fault circuit interrupter (GFCI) controlled and have outdoor weather proofing.

Figure 7E:
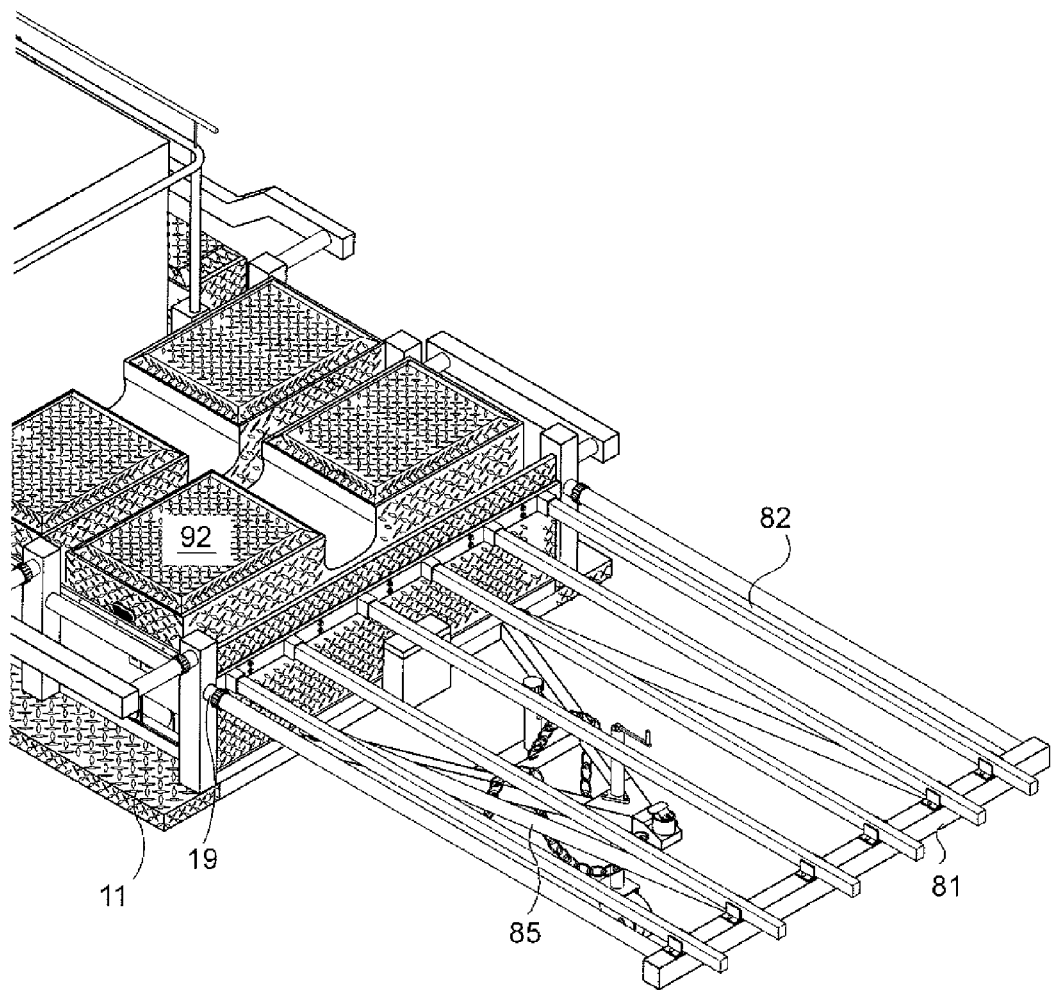
FIG. 7E is an enlarged perspective view of a plywood cutting table of the present invention.

FIG. 7C, together with FIG. 7E, illustrate plywood cutting table 81, 82 (or forward cutting table, or surface planning table) of the present invention 10. Structurally speaking, the table 81, 82 comprises a forward permanent structural member 89 configured horizontally at a forward end of the portable work area 10 above approximately a bumper level. A horizontal table support frame 81 is then slidingly configured to the frame 19 (horizontal fixed member 19), wherein the frame 19 is approximately at a same height as forward permanent structural member 89. A plurality of female structural members 83 are provided along the rear permanent structural member 89 wherein each female member 83 is configured to receive a corresponding two-by-four 82, wherein each of the corresponding two-by-fours 82 are arranged over the horizontal table support frame 81 and provide support for a forward work table (plywood cutting table). This forward cutting table 81, 82 is conveniently used for cutting large sheet materials and doors. It 81, 82 provides a large horizontal surface area for plywood, for example 72"×60". It is additionally contemplated that vacuum boom 74, 75 can provide dust abatement to the forward cutting table 81, 82.

Figure 8:
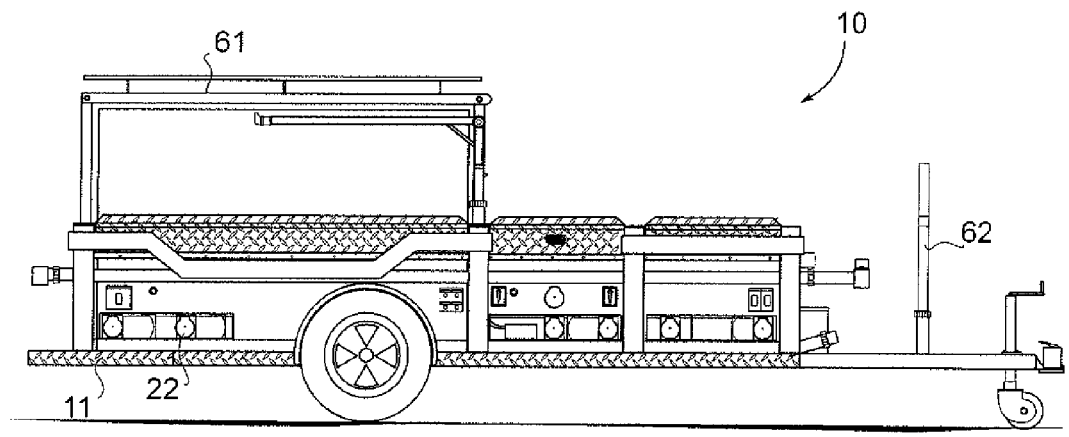
FIG. 8 is a right side profile view with additional super structure shown.

FIG. 8 provides a right side profile view of the first preferred embodiment however with the full superstructure 61 provided as a lumber rack 61 together with the forward pole with U-configuration 62.

Figure 9:
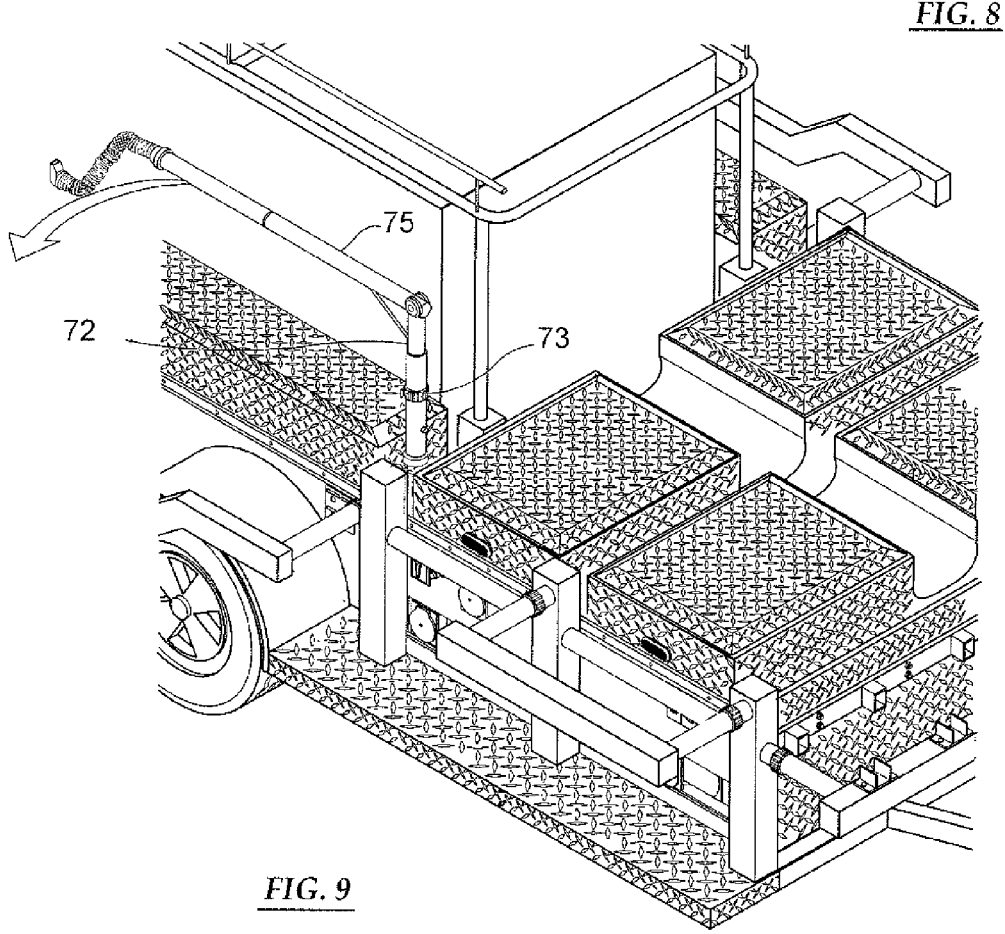
FIG. 9 is an enlarged perspective view of the right front quarter portion.

FIG. 9 provides an enlarged perspective of the right front quarter portion and a novel vacuum boom 75 of the present invention. The boom 75 provides added versatility to reach between several work stations. In a first embodiment as shown, the vacuum boom 75 comprises a vertical rigid post 72 coupled to a horizontal rigid boom 75, in addition to a flexible vacuum suction hose 74 coupled to the boom 75, further wherein boom and post 72, 75 can rotate about rotating member 73 (collar). In a second embodiment the post 72 is a hollow pipe and the flexible hose 74 is directly coupled to the hollow pipe 72 with the boom 75 and hose 74 connected thereto.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below of a certain combination, it must be expressly understood that the invention includes other combinations of fewer, more or different elements, which are disclosed above even when not initially claimed in such combinations.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

While the particular Mobile Workstation as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A portable work area particularly for carpentry comprising:
   a flat bed trailer configured to be coupled to a trailer hitch;
   a frame defining a height of the portable work area, the frame comprising:
      an aperture; and
      a horizontal member slidingly disposed within the aperture, wherein the horizontal member is configured to support a work table in a deployed position, and wherein the horizontal member is secured slidingly inwardly with a secured detent pin in a stowed for transport position;
   a forward permanent structural member configured horizontally at a forward end of the portable work area above a bumper level;
   a horizontal table support frame slidingly configured to the frame, the frame approximately at a same height as forward permanent structural member; and
   a plurality of female structural members provided along the rear permanent structural member, each of said plurality configured to receive a corresponding two-by-four, wherein each of the corresponding two-by-fours are arranged over the horizontal table support frame and provide support for a forward work table.

2. The portable work area particularly for carpentry of claim 1 further comprising a pipe fixed to the flat bed trailer, the pipe further coupled to a vacuum motor, the vacuum motor providing a negative pressure with respect to atmosphere at the pipe fixed to the flat bed trailer.

3. The portable work area particularly for carpentry of claim 2 further comprising a vacuum boom, the boom comprising:
   a vertical rigid post;
   a horizontal rigid boom;
   a flexible pipe connected to the vertical pipe and the horizontal rigid boom; and
   a rotating member providing for the flexible pipe to rotate around the vertical pipe.

4. The portable work area particularly for carpentry of claim 1 further comprising:
   a compressor for providing compressed air to each of a plurality of work stations;
   a plurality of storage boxes configured to the flat bed trailer;
   a work table supported by the horizontal member, the work table further coupled to a power saw, wherein the storage boxes have a height being a same height as the work table; and
   a first and second electrical circuits minimizing a chance that the portable work area will draw too much power from a single source.

5. The portable work area particularly for carpentry of claim 1, the frame further comprising a lumber rack configured for storing and transporting wood and trim materials.

6. The portable work area particularly for carpentry of claim 1, further comprising:
   a vacuum filter; and
   a vortex dust separator for separating dust from air thereby prolonging a need to clean a vacuum filter.

* * * * *